Dec. 31, 1968  W. OFFENBACHER ET AL  3,419,374
DETECTING RIBBON FORMATION ABNORMALITIES
IN DRAWING GLASS SHEETS

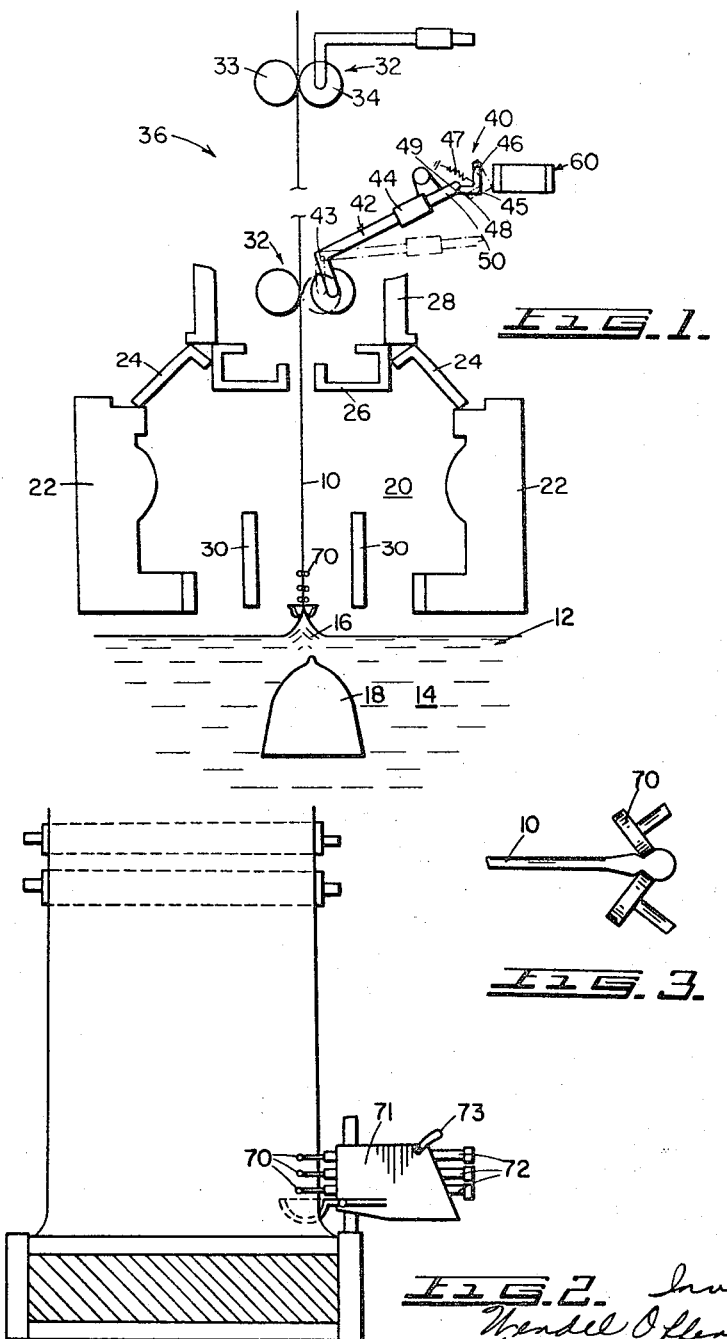

Filed June 24, 1964  Sheet 2 of 6

Inventors
Wendel Offenbacher
Leo Bill Kowal
By Cushman, Darby & Cushman
Attorneys

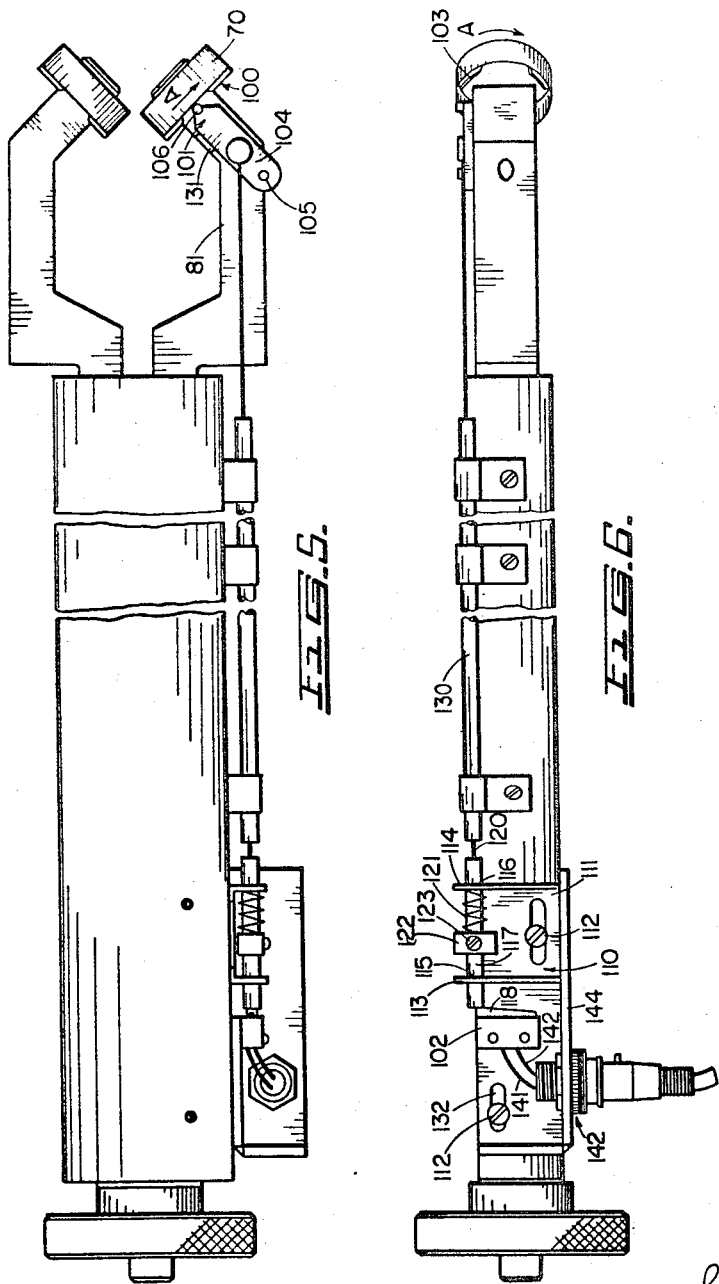

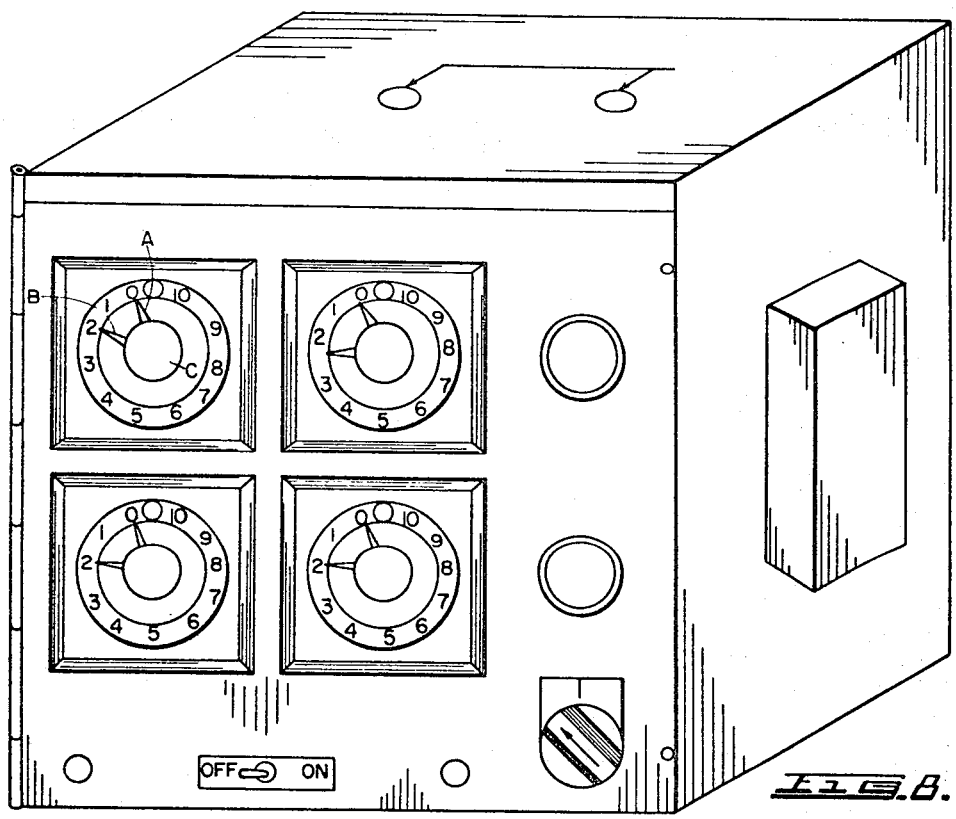

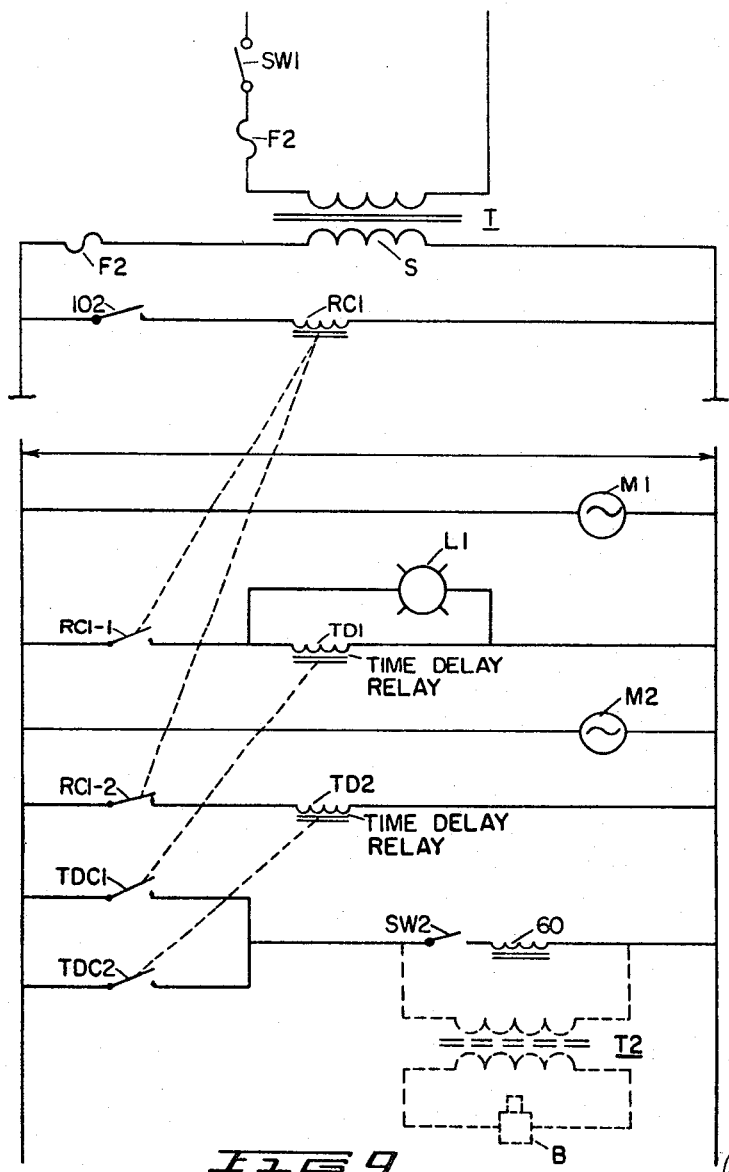

United States Patent Office 3,419,374
Patented Dec. 31, 1968

3,419,374
DETECTING RIBBON FORMATION ABNORMALITIES IN DRAWING GLASS SHEETS
Wendel Offenbacher, St. Laurent, Quebec, and Leo Bill Kowai, Beaurepaire, Quebec, Canada, assignors to Pittsburgh Plate Glass Company, Pittsburgh, Pa.
Filed June 24, 1964, Ser. No. 377,575
Claims priority, application Canada, Nov. 7, 1963, 888,552
1 Claim. (Cl. 65—160)

ABSTRACT OF THE DISCLOSURE

Apparatus for detecting abnormalities in a ribbon of glass being drawn by draw rolls from a molten bath comprising speed sensing rollers engaging the edges of the glass and effecting actuation of electrical circuit means thereby to cause additional draw rolls to engage the glass sheet thereby to prevent the ribbon from breaking and dropping back into the bath. The edge rollers are located within the region of deformability of the glass and, in addition to sensing a slowing down of the draw speed of the ribbon, also are capable of detecting a narrowing or necking down of the ribbon.

---

This invention relates to the manufacture of sheet glass wherein a continuous ribbon of glass is drawn from a bath of molten glass and more specifically to apparatus for detecting abnormalities in the formed ribbon and thereby substantially eliminating periodic restarts due to breakage or major cracking of the ribbon.

In the production of sheet or window glass by the Pennvernon or Pittsburgh process and the Fourcault process, the sheet of glass in the form of a continuous ribbon is drawn vertically upwardly through a cooled drawing chamber. The tractive force for drawing the glass is supplied by a drawing machine. The drawing machine includes a plurality of rolls arranged in pairs which frictionally grip opposed faces of the glass and draw the glass from the bath. One roll of each pair is called a swing roll and is arranged for movement away from the ribbon. Generally, the swing roll is counterweighted to frictionally engage the ribbon while being yielding to permit the passage of various irregularities in the glass. The other roll of each pair is referred to as a fixed roll and is journalled in bearings mounted in a fixed position. The rolls of each pair are driven so as to drive them at a constant speed.

The lower pairs of rolls, i.e., the first four or five pairs of rolls at the bottom of the drawing machine, are generally, during production runs, disengaged from the glass ribbon because they have a tendency to mar or otherwise damage the newly formed and deformable ribbon. When the ribbon is first started, these bottom rolls engage the ribbon but the glass being then formed is of relatively poor quality and is relegated to cullet.

At times during a production run, the glass ribbon, because of a flaw or defect, or because of temperature variations, cracks or breaks and starts to drop into the bath. This, of course, disrupts production and requires what is known as a reheat and a restart of the ribbon formation. The reheat is required because the glass of the ribbon must be remelted before the ribbon can be reformed. Additional heat is then applied to the bath of glass in the drawing bay. This operation entails a removal of the drawing chamber end walls, and the various coolers, etc., and results in an expensive production delay. The cost of manufacturing the product is materially increased.

After the reheat, the ribbon is restarted. A bait, i.e., generally a metal mesh of the ribbon width, is gradually lowered into the molten glass, so that glass adheres thereto. The bait is gradually withdrawn from the bath and at the proper time the rolls including the bottom ones normally disengaged from the sheet are sequentially moved into engagement with the newly formed ribbon.

The drawing chamber parts are then quickly replaced in the hope that the ribbon can be held. Of course, the quality of the glass drawn at this time is very poor and is relegated to cullet or scrap. Several hours are required to reach a stable drawing condition, so that a further time delay is interposed in the production of the sheet. And the cost of manufacturing the product is further increased. A restart of the type described caused by breakage of the ribbon and slippage of the ribbon into the bath results in a production delay of approximately 12 hours.

It has been found that dropping of the ribbon into the bath upon breaking can be almost completely eliminated if the bottom rolls normally disengaging the ribbon are quickly brought into engaging positions upon noting the slippage of the ribbon. To do this manually requires a continuous observation of the ribbon at all times during its upward travel which is not practical and is difficult because of the length of the path of travel.

Attempts have been made at sensing breakage of the ribbon or abnormalities in the formation thereof such as change of speed or width. These attempts include sensing mechanisms associated with the ribbon to emit signals responsive to ribbon speed. Problems however arise in employing suitable sensing mechanisms. In some instances separate speed sensing rollers are utilized. To be effective, the sensing mechanisms must be located in the deformable portion of the ribbon, and if they are of the type which contact the glass, they are susceptible to marring the surface of an otherwise satisfactorily formed ribbon. These sensing devices in some instances contact only one surface of the ribbon and in some such instances it will be found the drive is not sufficiently positive to ensure an accurate sensing of the ribbon speed.

It is an object of the present invention to overcome the above difficulties and provide a positive sensing device responsive to ribbon speed.

A further object is to provide a ribbon speed sensing device which contacts the ribbon but does not mar the normally usable portion of the ribbon or adversely affect the formation of such ribbon.

A still further object is to provide a ribbon speed or edge presence or absence sensing device which contacts opposed faces of the ribbon.

A still further object is to provide means to effect contact of the lower pairs of rolls with the formed ribbon in response to abnormalities occurring in the formation of such ribbon.

The invention is illustrated by way of example in the accompanying drawings, wherein:

FIGURE 1 is an elevational schematic view illustrating a ribbon of glass being continuously drawn from a bath of molten material and employing a ribbon edge holding and forming device;

FIGURE 2 illustrates in elevation the relative positioning of the edge holding and forming device and the ribbon of glass;

FIGURE 3 is a partial sectional plan view illustrating an edge of the ribbon of glass grasped between a pair of rollers of an edge holding and forming device;

FIGURE 5 is a view similar to that of FIGURE 4, illustrating the glass speed sensing mechanism;

FIGURE 6 is a front elevational view of FIGURE 5;

FIGURE 8 illustrates the control panel housing electrical apparatus which receives signals from the sheet speed sensing mechanism and in response thereto effects actuation of the roll assemblies;

FIGURE 9 is a schematic diagram illustrating the electrical circuit for a single sensing mechanism.

Figure 7:
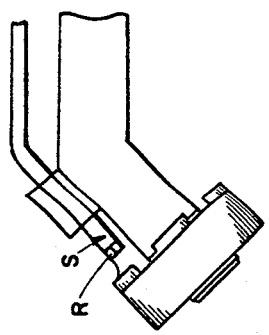
FIGURE 7 illustrates a modified wheel rotation sensing mechanism.

Referring now to the drawings, FIGURE 1 illustrates a Pennvernon or Pittsburgh drawing arrangement of conventional design and including a plurality of pairs of freely rotatable rollers which grasp the edge of the glass ribbon. The rollers grasping the edge are the subject matter of Canadian application 888,636, filed Nov. 8, 1963, entitled, "Edge Rollers in Drawing Glass Sheets," and assigned to the same assignee as the instant application. In accordance with the present invention there is associated with the edge rollers a sensing device for sensing breakage or slippage of the ribbon being drawn; signals therefrom being utilized for quickly lowering the bottom normally disengaged rolls of the drawing machine.

In the apparatus illustrated, a continuous ribbon 10 of glass is drawn from a bath 12 of molten glass contained within a drawing bay 14 of a glass melting furnace. The ribbon 10 forms a base or meniscus 16 with the surface of the bath 12. A submerged refractory clay shaper, known as a draw bar, identified as 18, defines the plane of the draw and stabilizes the sheet. The ribbon 10 is drawn through a cooled drawing chamber 20 defined in part by a spaced pair of L-blocks 22, ventilator coolers 24, catch pan coolers 26 and side walls 28. Machine coolers 30 traversing the ribbon are placed on opposite sides of the plane of the draw. Cooling water flows through the various coolers to absorb radiant energy reaching their surfaces. The tractive force to draw the glass is provided by vertically spaced assemblies 32 of a drawing machine 36. Each of the assemblies consists of a pair of relatively spaced rollers 33 and 34 which respectively contact opposed faces of the ribbon 10. The rolls 33 are journalled in bearings fixed in position while the rolls 34 are known as swing rolls and are movable into and out of engagement with the ribbons. Counterweights on the ends of levers attached to the swing rolls are provided to urge the rolls into frictional engagement with the ribbon. All rolls are commonly driven for uniformity of speed. Examples of drawing machines are United States Patent Nos. 2,300,522 of J. H. Redshaw, issued Nov. 3, 1942; and 2,974,447 of F. C. Tasher, issued Mar. 14, 1961, both assigned to the assignee of the present application.

The catch pans, in addition to functioning as coolers, collect fragments or chips of glass which fall down through the drawing machine toward the bath.

The lower four or five swing rolls are generally disengaged from the ribbon because they tend to mar the tender surface of the still readily deformable ribbon. The swing rolls are disengaged by physically lifting them away from the glass ribbon. The back or fixed rolls are disengaged, (1) by virtue of the physical suspension of the drawing machine, i.e., the drawing machine is disposed at a slight angle with respect to the plane of ribbon draw, and (2) by virtue of the fact that disengagement of the swing rolls causes the glass ribbon to come forward and away from the back rolls a minute distance and thus the back rolls no longer are in engagement with the glass ribbon. To hold the swing roller disengaged, a latching arrangement 40 is provided, such latching arrangement being disengageable upon certain conditions.

The latching arrangement 40 includes a lever arm 42 supporting at one end thereof the roll 34 and a counterweight 44 at the opposed end. The lever arm is pivotally mounted at 43 and retained in an upper position by a latch 45 pivoted at 46, such latch being biased toward the drawing machine by resilient means shown as a spring 47. The latch 45 has a foot portion 48 engageable within a notch 49 of lever arm 42. Movement of the latch against tension of the spring permits the swing roll to engage the glass ribbon under the influence of the counterweight. To relatch the swing roll to its ribbon disengaged position requires a lifting of the arm 42 either manually or with the aid of a rope-pulley arrangement 50.

The latch 45 is a relay arm of a relay 60. Upon energization of the coil of the relay, the latch is drawn towards the coil and away from the drawing machine; thereby disengaging the arm 42 and releasing the swing roll to return to its home position, i.e., in engagement with the glass ribbon. The engagement of the swing roll with the ribbon also causes engagement of the fixed roll of the pair of rolls of the ribbon and restricts the glass ribbon between this swing roll and the corresponding fixed roll on the other side of the glass thereby preventing the glass ribbon from falling back into the bath. In other words, because the rolls now engaging the ribbon are driven, a tractive force thereby is applied to the ribbon. Generally the engagement of the lower pairs of rolls with the ribbon occurs (1) upon start-up of the draw and (2) upon breakage within the drawing machine of the ribbon above the locations of the lower rolls. Thus, the lower rolls when engaged, apply a tractive force to the ribbon between the drawing chamber and the break in the ribbon.

To automate the lowering of the swing rolls of the lower pairs of drawing rolls, any abnormality in the draw of the ribbon such as a break in the ribbon must be detected and the relay 60 must be energized. To detect any such break, a ribbon speed-sensing device is utilized, such device also sensing the absence or presence of the ribbon edge.

In the drawing operation, the ribbon has a tendency to neck down or narrow. In order to maintain a substantially constant width, a plurality of pairs of knurled type rollers grasping opposed edges of the ribbon have normally been used. These have been replaced by freely rotatable rollers 70 described more fully in the aforementioned Canadian application. These rollers are positioned no higher than the region of deformability of the glass. That is, the rollers are utilized in that region of the ribbon wherein the latter will yield under the lateral forces exerted by rollers 70. As a practical guide the region of deformability extends to roughly 18 inches above the molten bath of glass.

The rollers 70 are supported in position by support means extending into the drawing chamber from an enclosure 71. The enclosure projects through a side wall of the drawing chamber and is illustrated only schematically in FIGURE 2. The enclosure at opposed sides of the furnace slidably receives elongated box-like in cross-section slide members 72 which project through the furnace wall. Each of these slide members are guided in their movement by suitable means and included are individual locking means adapted to fix the slide members in any desired position. The lock may for example consist of an eccentric brought into and out of engagement with the slide member selectively to lock and unlock the slide member upon movement of a handle 73.

Figure 4:
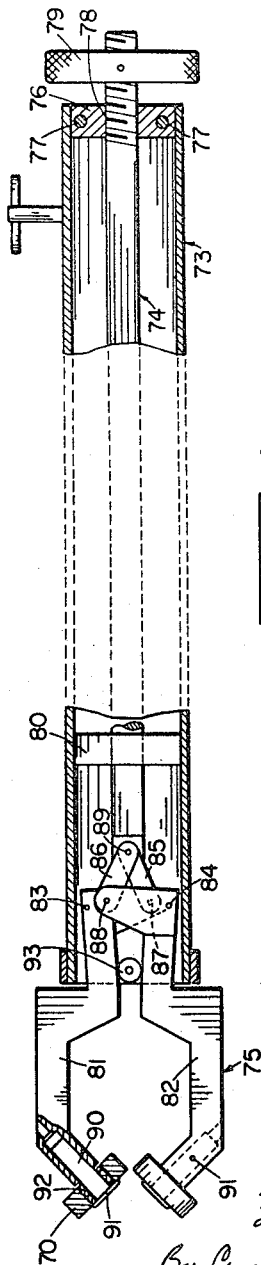
FIGURE 4 is a partial sectional plan view of an edge hold down and forming device.

Referring now to FIGURES 4, 5 and 6, a pair of freely rotatable rollers 70 are suspended in the furnace chamber by the slide members 72 each of which includes a housing 73, a rod 74 journalled in the housing and a pair of pivotally mounted arms forming a jaw 75.

The housing 73 is a box-like member closed at one end by a plate 76 secured thereto by a pair of pins 77. The opposed end of the housing is open and disposed within the housing is the rod 74. The rod is threaded at one end which passes through a threaded aperture 78 in the end plate 76 and thereby permits relative longitudinal movement of the housing and rod by rotation of the latter. To facilitate rotation of the rod, a knurled knob 79 is secured to the rod on a portion which projects beyond the housing.

The rod 74 is also supported by a plate 80 disposed within the housing; the rod passing through an aperture in the plate. The plate may be secured to the housing and the rod freely rotatable in an aperture therein, or alternatively, the plate may be secured to the rod and be circular so as to freely rotate in the housing. The end of the rod remote from the knurled knob 43 is connected through a lever arrangement to two arms 81 and 82, these arms being free to pivot about respective pins 83, 84 secured to the housing. The lever arrangement consists of a pair of levers 85 and 86 pivotally connected at one end respectively to extensions on arms 81 and 82, by pins 87 and 88 and at the other end to the rod 74 by pin 89. A pin 56 acts as a stop to limit closure of the jaw 75. The free ends of the arms constitute the jaw referred to above and this jaw carries the rollers 20 which grasp an edge of the ribbon of glass being drawn. The arms 81 and 82 are each bored to receive a pin 90 provided with enlarged heads 91 which serve to retain the associated roller 70 in position. Set screws 93 retain the pins within the arms. Bushings 92 are interposed between the respective rollers 70 and the associated pin 90 to facilitate free rotation of the rollers.

The distance between the innermost edges of a pair of the rollers can be adjusted by rotation of the knurled knob 79. As this knob is rotated it moves the rod 40 backwardly or forwardly within the housing 73 depending on the sense of rotation and this pivots the arm 81 and 82 about the respective pivots which brings the ends of the cranked arms nearer to each other or moves them away from each other depending on the direction of the movement of the rod. Consequently the distance between the innermost edges of the rollers 70 can be set at a desired value by rotation of the knurled knob.

The manner in which a pair of rollers 70 is brought into engagement with the edge of the ribbon 10 will now be apparent. For engaging the ribbon the slide member 73 is pushed into the drawing chamber with the rollers 70 spread apart to a width greater than that of the ribbon. As soon as the rollers 70 are in alignment with the portion of the ribbon which it is desired to grip, the locking handle 73 is actuated to bring a cam into firm engagement with the upper surface of the slide member. The action of the cams in firmly locking the slide member 26 is important because the slide members would otherwise be pulled inwardly by the forces which the ribbon exerts on the rollers. The knurled knob is then rotated in a sense which serves to bring the rollers closer together and this rotation is continued until the sheet is engaged in the desired manner. The minimum permitted distance between a pair of rollers is limited by the stop 93 secured to the housing 73.

The rollers 70 are normally not cooled for it is preferred that they should be allowed to be in thermal equilibrium with the glass with which they are in contact. However, in some cases for example when glass adheres thereto, it is desirable that the lowermost set of rollers 70 should receive a small amount of cooling. For this purpose there may be provided tubes for supplying jets of compressed air which play against the rollers 70 on the sides thereof which are remote from the ribbon 10.

Three sets of rollers 70 are shown in FIGURES 1 and 2. Three such sets are disposed at each of the two vertical edges of the ribbon and these effectively serve to maintain the width of the ribbon or sheet. They achieve this with considerably less wastage at the edge of the sheet than is the case when using the heavy, driven knurled rollers. By contrast with these latter rollers which contacted the ribbon over a substantial area, the rollers 70 contact the surface of the ribbon along a sharp peripheral edge and rotate about an axis inclined at about 30 to 60°, preferably 45°, to the plane of the ribbon 10. Furthermore the rollers 70 are not driven but rather are freely rotatable.

Each pair of rollers 70 grasp the ribbon 10 therebetween and, as shown in FIGURE 3, form a groove in the ribbon by virtue of the fact that the rollers 70 engage the ribbon within the region of deformability thereof. The rollers are in contact with the ribbon and through tractive forces are driven at a speed proportionate to that of the speed of the draw. According to the present invention, any decrease in the speed of rotation of these rollers is utilized to effect actuation of the solenoid 60.

Referring to FIGURES 5 and 6, one of the rollers 70 is provided with a cam surface 100 disposed remote from the ribbon of glass and associated therewith is a cam follower 101 which through a linkage mechanism effects make and break of an electrical switch 102.

The cam is multi-lobed having an equal number of dwell and rise periods each being of equal intervals. The rollers are made from Stellite so as to withstand the heat and the dwell portion of the cam is provided by a side face of the roller while the raised part of the cam consists of a plurality of circumferentially spaced nodes 103. These nodes are formed by welding material to the Stellite roller and in the instant case there are four such nodes.

The cam follower 101 consists of a bar-like lever 104 pivoted at one end to the arm 81 by a pin 105. The other end of the lever terminates in a rod-like portion 106 having the axis thereof formal to the axis of the roller 70. The rod-like portion 106 is the cam follower and slidingly bears against the cam surface. The rod-like portion and lever are also made of Stellite material so as to withstand the heat.

The switch 102 is a micro-switch or similar type and is secured to the housing 75 on a portion disposed exteriorly of the furnace or glass drawing chamber. The switch is of the type normally biased to an open or closed position and is fixed to a bracket 110. The bracket 110 includes a web portion 111, secured to a wall of the housing 75 by a pair of screws 112, and a pair of parallel spaced legs 113 and 114. The legs project from the web and include aligned apertures 115 and 116 which provide a guide for a rod 117. One end of the rod bears against an actuating member 118 for the switch 102 and the opposed end of the rod is secured to a cable or wire 120. The rod 117 is free to reciprocate back and forth in the apertured legs and is resiliently biased (to the left in FIGURE 6) by a spring member 121. The spring bears against the leg 114 of the bracket and a stop 122 fastened to the rod by a set screw 123.

The wire 120 (which for example may be iron-constantin thermocouple wires B and S—gauge H20) is protected for a portion of its length by a tube 130 and is secured at one end to the lever 104. The lever 104 is biased inwardly through the action of spring 121 to abut against a stop 131 secured to the arm 81. The tension in the spring 121 may be be varied by effecting relative movement between the bracket and housing wall. For this purpose elongated slots 132 are provided in the web of the bracket.

Rotation of the roller 70 in the direction of arrow A causes the lever 104 to oscillate about the pivot 105 and thereby effect reciprocation of the wire 130. Such reciprocation is of sufficient magnitude to cause the micro-switch to cyclically open and close. The frequency of the opening and closing depends upon the number of rise and dwell surfaces on the cam surface. In the instant case there are four of each, i.e. the rise and dwell. There can be however any number depending upon the precision of a timer used in association therewith in a manner to be described in detail hereinafter.

A pair of leads 140 and 141, in series with the contacts of the switch 102 terminate in one portion of a coupling 142. The coupling is secured to a further leg 144 of the bracket and a further portion of the coupling provides means for connecting or disconnecting the circuitry of a timing mechanism 200 to the switch 102.

Figure 10:
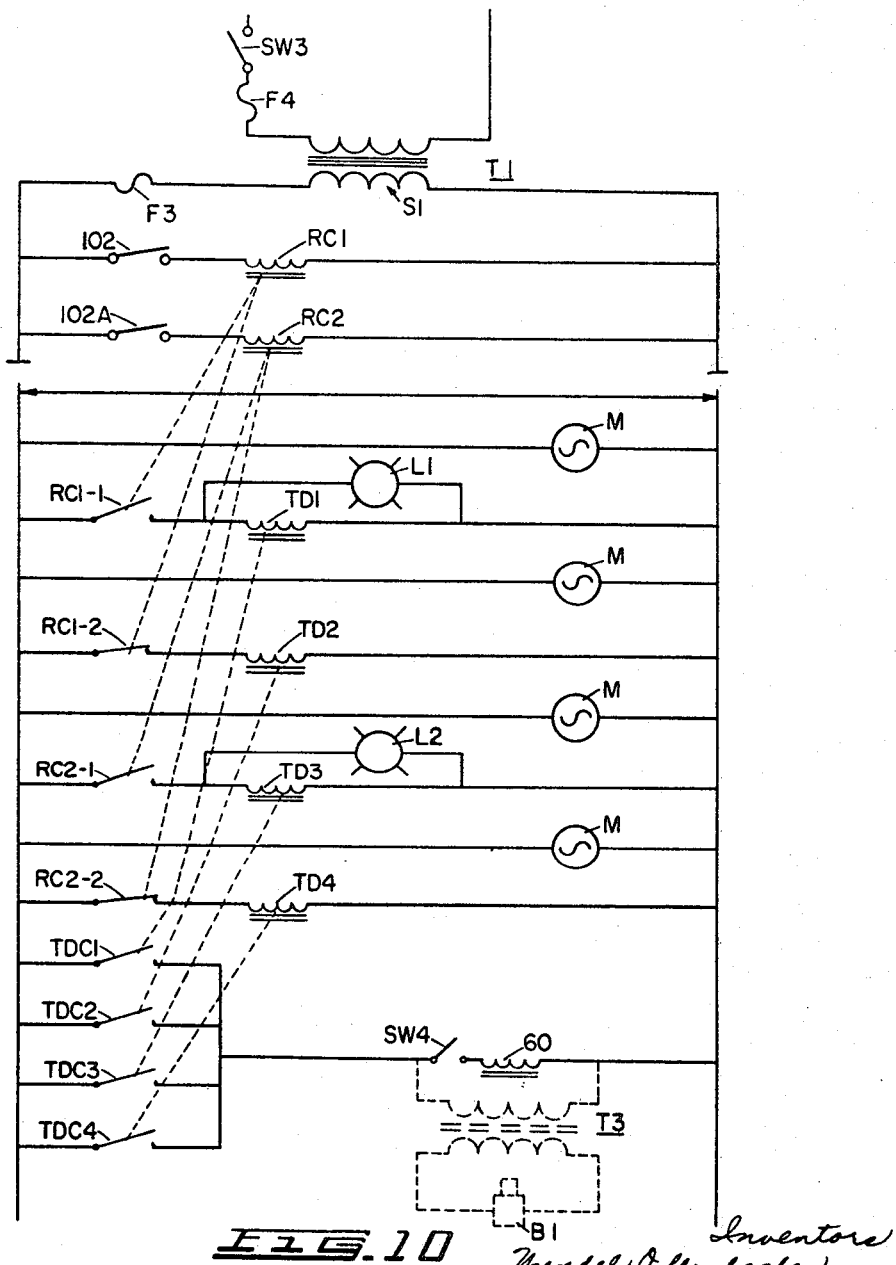
FIGURE 10 is a schematic diagram illustrating the electrical circuit for a pair of sensing mechanisms.

The circuitry for effecting actuation of the solenoid 60 in response to a change in the interval of the make and break of switch 102 is schematically illustrated in FIGURES 9 and 10.

The circuit in FIGURE 9 is for one pick-up or sheet sensing means, i.e. in the instant case only one roller assembly which would be disposed adjacent one edge of the ribbon of glass.

The circuit includes a first and second portion which are the sensing and operating portions. The first portion consists of the switch 102 in series with each of the secondary S of a transformer T and a relay coil RC1 of a reset type timer. A suitable commercially available timer is one supplied by Eagle Signal Company of Moline, Ill., and identified as their series HP5. This timer is a synchronous motor driven adjustable time control instrument, the face of four such timers being shown in FIGURE 8.

The first portion of the circuit also includes fuses F1 and F2 connected respectively in the secondary and primary circuits of the transformer and a control switch SW1 in the primary circuit portion of the transformer.

The second portion of the circuit is the central portion effecting actuation of the relay 60 upon predetermined conditions. This second portion of the circuit (normally operative on a 110 v. A.C.) consists of serially connected contacts RC1-1 and adjustable time delay relay TD1 shunted with a similar serially connected contact RC1-2 and adjustable time delay relay TD2. The contacts RC1-1 and RC1-2 are respectively normally open and closed contacts responsive to the relay coil RC1. The time delay relays are actuated by synchronous motors M1 and M2 to effect a timing out from variable selecting setting. Associated with and operative in response to the respective time delay relays TD1 and TD2 are shunted contacts TDC1 and TDC2 serially connected with a switch SW2 and solenoid 60. Shunting the switch SW2 and solenoid 60 is a transformer T2, show in phantom, which is operatively connected to an alarm bell B.

In operation of this circuit, the switch cyclically makes and breaks at a frequency dependent upon the speed of draw and the number of rise and dwell surfaces on the cam. The cam surface on the roller having approximately equal rise and dwell periods causes the switch to have substantially equal intervals of open and closed periods. Any variation in the speed of the draw will result in a change of these intervals.

In a dwell period of the cam, switch 102 is in the open position shown in FIGURE 8 and the relay contacts RC1-1 and RC1-2 are respectively open and closed. When the switch 102 is closed for the rise period of the cam, coil RC1 is actuated respectively closing and opening contacts RC1-1 and RC1-2. Closing of contacts RC1-1 actuates the time delay coil TD1 which in turn starts to time out. The interval of time out is selected such that before TD1 times out switch 102 is opened thereby de-energizing coil RC1 and opening contacts RC1-1. Upon de-energization of coil RC1 contacts RC1-2 close thereby starting the time out of time delay coil TD2.

The timers are preset to an interval slightly longer than the interval which the switch is open such that under normal selected drawspeed, the coils TD1 and TD2 do not become energized to effect actuation of respective contacts TDC1 and TDC2.

In the event the signal from switch 102 is delayed, the respective time delay relay, operative at that time, will time out closing its associated contact TDC1 or TCD2 thereby energizing solenoid 60. Energization of solenoid 60 trips the latch thereby permitting the associated draw rolls to engage the ribbon being drawn.

It is thus apparent that a decrease in the speed of the roller 70 will actuate solenoid 60. Since the roller 70 is freely rotatable and is in engagement with the surface of the glass, it is rotated in response to the speed of draw of the ribbon. It is obvious that should the roller disengage the ribbon of glass, frictional resistance will cause an immediately slowing down; further slowing being effected by the drag thereon of the cam follower. This change in speed of roller 70 may be caused by a loss of edge of the ribbon, i.e. a narrowing or necking down of such ribbon with drawing of the ribbon still continuing or by a complete break in the ribbon. It is obvious that such speed sensing mechanism may be utilized to energize a circuit to control the rate of speed of draw.

The sensing roller described is normally the uppermost of the plurality of such rollers used. This is because the tendency of the ribbon to neck down increases as the ribbon progresses from the bath.

More than one sensing roller may also be used, in fact it is desirable to use a pair of sensing rollers in which case they would be disposed at opposed edges of the ribbons. FIGURE 10 is a schematic view of a circuit for such an arrangement.

In FIGURE 10 the first portion of the circuit consists of a pair of sensing switch 102 and 102A respectively in series with relay coils RC1 and RC2 shunted across the secondary S1 of a transformer T1. There are fuses F3 and F4 respectively in the secondary and primary circuits of the transformer and the latter is also serially connected with a switch SW3.

The second portion of the circuit consists of adjustable time delay relays and contacts arranged in the same manner as those of FIGURE 8 but in duplicate, i.e. there are four time delay relays TD1, TD2, TD3, TD4 respectively in series with contacts RC1-1, RC1-2, RC2-1, RC2-2 all of these series circuits being in shunt with a shunted bank of time relay contacts TDC1 to TDC4 inclusive such a bank being in series with the solenoid 60, and a switch SW4. A bell B or alarm is connected in the circuit by a transformer T3 shown in phantom.

The operation of this circuit is the same as that previously described, the solenoid 60 being energized by the closing of any one of time delay contacts TDC1 to 4 upon an abnormality in the cyclic operation of either switch 102 or 102A.

The operation of the switches 102 and 102A are visually indicated by lamps L1 and L2 in circuit respectively with relay contacts RC1-1 and RC2-1. A further visual indication (by the use of the aforementioned timers) is provided by pointers A and B on each timer. On these timers, arrow B is set by knob C to the desired delay interval while arrow A upon actuation of the timer advances to this same position and begins to time out, advancing clockwise to 0 as time progresses. Since the pointer does not reach 0 under normal operation it oscillates continuously under normal operations proportionate to the make and break time of the associated contacts of the sensing device.

The switch 102 in the instant case is disposed exteriorly of the furnace chamber. This permits use of an ordinary switch while the more simple actuating part, which is made of special material, is disposed within the chamber. An obvious modifications of course includes make and break contacts actuated directly by the turning of the roller. One such modification is shown in FIGURE 7 where the movable part R of a sensing switch S has an extension E which contacts the cam surface of the roller. The extension E is effectively the cam follower. With this arrangement the switch is disposed within the furnace chamber and thus special materials are necessary so that the switch contacts and manipulating parts can withstand the heat. One difficulty with such arrangment is to find a resilient biasing means maintaining the contacts normally closed. Heat normally effects an accelerated degeneration of resiliency of materials and thus the life span of such an arrangement is very short.

From the foregoing description it will be obvious that the frequency of signals are dependent upon the number of lobes on the cam. The dwell and rise periods are approximately equal although not necessarily so since commercially available timers have a certain amount of tolerance. Frequent signals are desirable because the operator must be warned within a very short time after the break in the ribbon occurs or also very shortly after the edge is lost. It is preferred that the maximum interval between signals be two seconds because under normal circumstances there is not more than four or five seconds within which to catch the ribbon and thus alleviate having to restart the draw. It will be obvious that the instant device permits a substantially instantaneous detection of an edge loss, whereas in previous attempts there was considerable delay before this could be detected. Also as previously mentioned, the preferred location of the detector or signal roll is the uppermost one which is in the region where edge loss has the greatest tendency to occur.

We claim:

1. In an apparatus for drawing sheet glass as a continuous ribbon at a predetermined speed from a bath of molten glass upwardly through a drawing chamber which includes a first pair of drawing rolls disposed with opposing surfaces constantly engaged with opposite faces of the continuous ribbon of glass moving upwardly therebetween, a second pair of drawing rolls positioned below said first pair of drawing rolls wherein one of said rolls is movable into and out of engagement with said ribbon, and edge-contacting roller means located below said second pair of rolls and within the region of deformability of the glass ribbon for preventing transverse neck-down of the ribbon, the improvement comprising (a) sensing means associated with said edge-contacting roller means for producing a signal in response to a decrease of the speed of rotation of said edge-contacting roller means below a predetermined value, said sensing means including means cyclically operative by said roller means in response to the rotational speed thereof to effect alternate make and break of an electrical circuit, (b) means responsive to an abnormality in the make and break of said circuit to provide said signal, and (c) means for moving said movable roll of said second pair of drawing rolls into engagement with said ribbon in response to said signal.

References Cited

UNITED STATES PATENTS

| | | | |
|---|---|---|---|
| 1,616,371 | 2/1927 | Howard | 65—200 |
| 1,731,249 | 10/1929 | Mambourg | 65—200 |
| 3,188,192 | 6/1965 | Parobeck et al. | 65—163 |

FOREIGN PATENTS 176,590  9/1961  Sweden.

DONALL H. SYLVESTER, *Primary Examiner.*

FRANK W. MIGA, *Assistant Examiner.*

U.S. Cl. X.R.

65—29, 91, 158, 163, 199, 201

UNITED STATES PATENT OFFICE
CERTIFICATE OF CORRECTION

Patent No. 3,419,374                      December 31, 1968

Wendel Offenbacher et al.

It is certified that error appears in the above identified patent and that said Letters Patent are hereby corrected as shown below:

In the heading to the printed specification, line 5, "Kowai" should read -- Kowal --.

Signed and sealed this 17th day of March 1970.

(SEAL)
Attest:

Edward M. Fletcher, Jr.            WILLIAM E. SCHUYLER, JR.

Attesting Officer                   Commissioner of Patents